Jan. 28, 1936.　　　G. J. THOMAS　　　2,029,087
BRAKE MECHANISM
Filed July 9, 1934　　　2 Sheets-Sheet 1
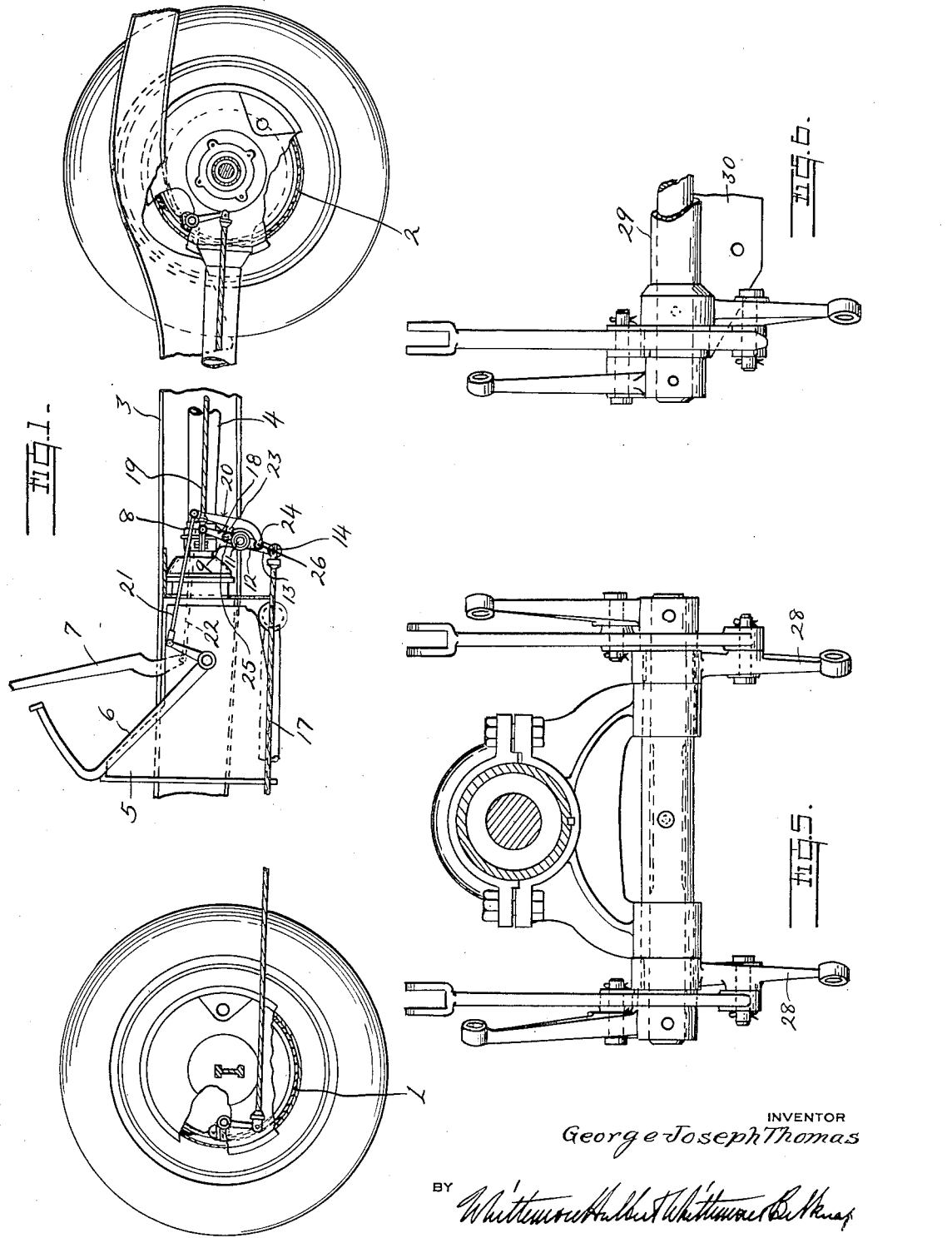
INVENTOR
George Joseph Thomas
BY
ATTORNEYS Jan. 28, 1936.  G. J. THOMAS  2,029,087
BRAKE MECHANISM
Filed July 9, 1934  2 Sheets-Sheet 2
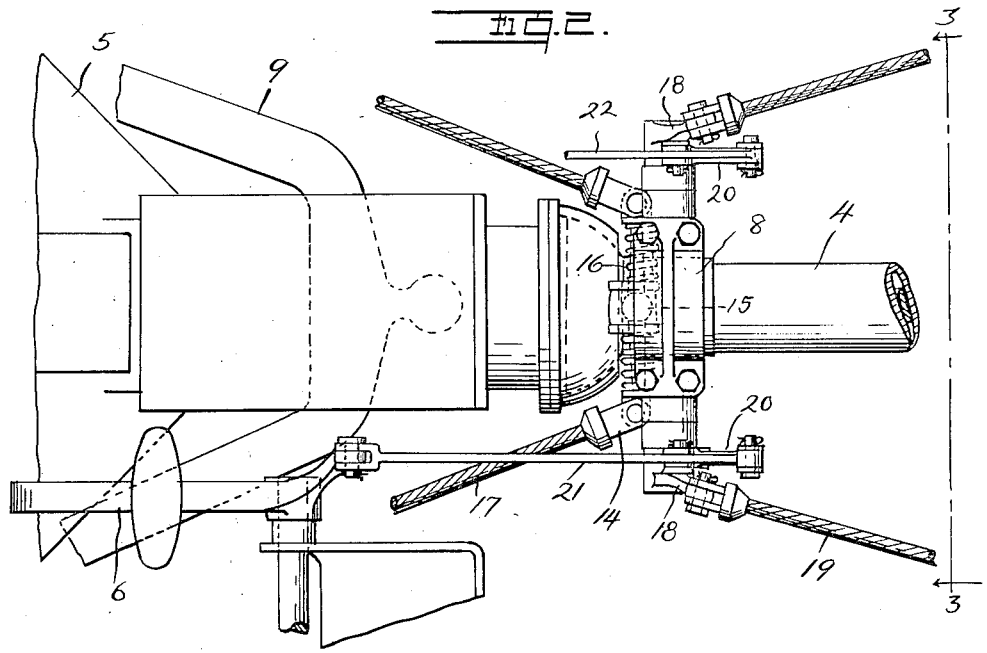
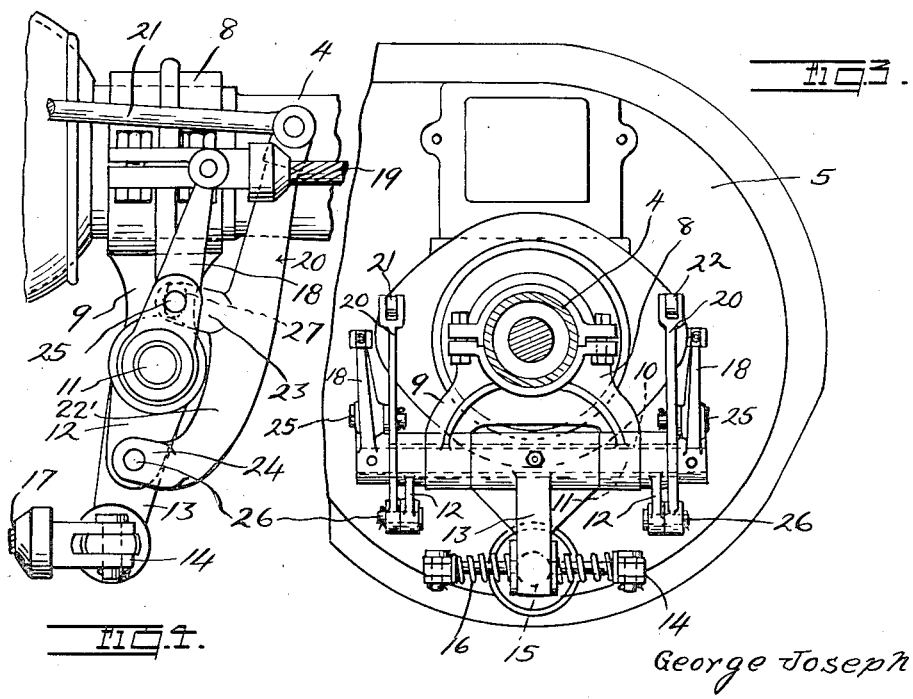
INVENTOR
George Joseph Thomas
BY
ATTORNEYS Patented Jan. 28, 1936

2,029,087

UNITED STATES PATENT OFFICE 2,029,087

BRAKE MECHANISM

George Joseph Thomas, Birmingham, Mich., assignor to Kelsey-Hayes Wheel Company, Detroit, Mich., a corporation of Delaware Application July 9, 1934, Serial No. 734,411

14 Claims. (Cl. 188—204)

The invention relates to brake mechanism and has for one of its objects to provide an improved construction of mechanism for actuating the front and rear wheel brakes of a motor vehicle. Another object is to so construct the mechanism that it is adapted to exert a predetermined ratio of the total braking force to the front and rear wheel brakes. A further object is to so construct the mechanism that it assures the operation of the front and rear wheel brakes, irrespective of their relative adjustment.

These and other objects of the invention will become apparent from the following description, taken in connection with the accompanying drawings, in which Figure 1 is an elevation, partially broken away, illustrating a brake mechanism embodying my invention;

Figure 2 is a plan view of a portion of Figure 1;

Figure 3 is a cross section on the line 3—3 of Figure 2 with the brake operating connections omitted;

Figure 4 is an enlarged view of a portion of Figure 1;

Figures 5 and 6 are views similar to Figure 3, illustrating other embodiments of my invention.

The brake mechanism embodying my invention is designed to be applied to a standard construction of motor vehicle having the front and rear wheel brakes 1 and 2 respectively, the chassis frame 3, the torque tube 4 encircling the propeller shaft and extending from the rear axle to a cross bar of the chassis frame, the transmission 5 which is located between the engine and the propeller shaft, the foot or service brake pedal 6 and the hand or parking brake lever 7.

For the purpose of operating the brakes from either the foot pedal or the hand lever, I have, as shown in Figures 1, 2, 3 and 4, provided the following construction: 8 is the support encircling and fixedly secured to the front end of the torque tube 4 adjacent its universal anchor to the chassis frame. This support is in the nature of a yoke having the depending laterally spaced arms 9. 10 is a sleeve member which forms a hollow shaft and which extends through and is journaled in these arms and 11 is a member forming a shaft which extends through and is journaled in the sleeve and has its ends terminating beyond the ends of the sleeve. 12 are members in the form of levers depending from and non-rotatably secured to the ends of the sleeve as by being keyed thereto, the hubs of these levers being adjacent the outer ends of the hubs of the arms 9, 13 is a lever depending from and non-rotatably secured to the sleeve between the hubs of the arms 9 and 14 is a horizontal evener lever extending parallel to and below the sleeve 10 and having centrally of its ends the spherical bearing 15 in the lower end portion of the lever 13. The evener lever is centrally positioned by the coil springs 16. The ends of this evener lever are connected by suitable means, such as the cables 17, to the front wheel brakes. 18 are members also in the form of levers non-rotatably secured to the ends of the shaft 11 as by being pinned thereto. The hubs of these levers are located adjacent the outer ends of the hubs of the levers 12 and these levers 18 extend upwardly or in a direction opposite to that of the levers 12. The upper or free ends of these levers 18 are connected by suitable means, such as the cables 19, to the rear wheel brakes.

With this arrangement, it will be seen that there is a downwardly extending lever 12 and an upwardly extending lever 18 at corresponding ends of the sleeve 10 and the shaft 11, one lever being connected to a front wheel brake and the other lever being connected to a rear wheel brake. To actuate these levers and apply the brakes from either the foot pedal 6 or the hand lever 7, I provide actuating members in the form of levers 20, one of which is connected to the foot pedal 6 by the rod 21 and the other of which is connected to the hand lever 7 by the rod 22. These levers 20 are located so that one operates the levers 12 and 18 at the same ends of the sleeve and the shaft and the other operates the levers 12 and 18 at the other ends of the sleeve and the shaft. Each actuating member or lever 20 has the body 22' which extends in rear of the levers 12 and 18 and the upper and lower transverse arms 23 and 24 respectively, which extend forwardly from the body and are rigid therewith. The arm 23 is located intermediate the ends of the body and extends opposite and at the side of the lever 18 above its hub and is pivotally connected to this lever by the pivot pin 25. The arm 24 is located at the lower end of the body 22' and extends opposite and at the side of the lever 12 below its hub and is pivotally connected thereto by the pivot pin 26. It will thus be seen that the lever 20 upon being swung in a counter clockwise direction swings both the levers 12 and 18 to which it is pivotally connected and also that this lever is mounted upon and carried by these levers. It will also be seen that the lever 20 extends adjacent the opposite sides of the levers 12 and 18 to which it is connected so that in effect the lever 20 extends between the associated levers 12 and 18.

For the purpose of exerting a greater ratio of the total braking pressure to the front wheel brakes upon the application of either the foot pedal 6 or the hand lever 7, each pivot pin 26 is located so that the ratio of the distance between the axis of the shaft 11 and the axis of the pivot pin 26 to the distance between the axis of the shaft 11 and the axis of the pivotal connection of the lever 14 to the cables 17 is greater than the ratio of the distance between the axis of the shaft 11 and the pivot pin 25 to the distance between the axis of the shaft 11 and the pivotal connection of the levers 18 to the cables 19. To also secure operation of the front and rear wheel brakes, irrespective of their relative adjustment, the connections between each of the levers 20 and the associated levers 12 and 18 are such that during the application of the brakes and when one of the levers 12 and 18 has reached its limit of movement, the lever 20 may be further swung to further swing the other of the levers 12 and 18 which has not reached its limit of movement. As shown, each lever 18 is provided with the longitudinally extending slot 27 through which the pivot pin 25 extends and which permits of relative angular movement of the levers 12 and 18 to secure the operation of the front and rear wheel brakes.

In the modification shown in Figure 5, the same general arrangement of parts is present, except that the front wheel brakes are directly connected to the lower ends of the levers 28 which correspond to the levers 12.

In the modification shown in Figure 6, the support for the hollow shaft or sleeve 29 is in the nature of the bracket 30 which is secured to the rear face of the transmission 5. Aside from this, the construction is essentially the same as that shown in Figure 4.

What I claim as my invention is:

1. In a motor vehicle front and rear wheel brake system, the combination of a pair of downwardly and upwardly extending pivotal members respectively connected to the front and rear wheel brakes, and an actuating member pivotally connected to said downwardly and upwardly extending pivotal members respectively below and above their pivots.

2. In a motor vehicle front and rear wheel brake system, the combination of a pair of downwardly and upwardly extending pivotal members respectively connected to the front and rear wheel brakes, and a single actuating member connected to said downwardly and upwardly extending pivotal members respectively below and above their pivots, the connection between said single actuating member and one of said pivotal members providing for movement of said pivotal members relative to each other.

3. Brake mechanism, comprising pivotal levers extending in opposite directions and a third lever for actuating said pivotal levers, said third lever being pivotally connected to said pivotal levers.

4. Brake mechanism, comprising pivotal levers extending in opposite directions and a third lever for actuating said pivotal levers, said third lever being pivotally connected to and mounted upon said pivotal levers at opposite sides of their pivots.

5. Brake mechanism, comprising pivotal levers extending in different directions and a third lever for actuating said pivotal levers, said third lever having arms, a pivotal connection between one of said pivotal levers and one of said arms, and a sliding pivotal connection between the other of said pivotal levers and the other of said arms.

6. Brake mechanism, comprising pivotal levers extending in opposite directions and a third lever for actuating said pivotal levers, said third lever having arms at opposite sides of the pivots of the pivotal levers, a pivotal connection between one of said pivotal levers and one of said arms, and a sliding pivotal connection between the other of said pivotal levers and the other of said arms.

7. Brake mechanism, comprising shafts, rockable levers on said shafts and extending in different directions therefrom, and a third lever pivotally connected to and mounted upon said rockable levers at different sides of said shafts.

8. Brake mechanism, comprising shafts, rockable levers on said shafts and extending in opposite directions therefrom, one of said levers being provided with a longitudinally extending slot and a third lever having arms at opposite sides of said shaft and extending respectively adjacent to said rockable levers, a pivot extending through the slot in one of said rockable levers and engaging one of said arms, and a pivot engaging the other of said rockable levers and the other of said arms.

9. In a motor vehicle front and rear wheel brake system, the combination of shafts, an upwardly extending rockable lever on one of said shafts connected to a rear wheel brake, a downwardly extending rockable lever on the other of said shafts connected to a front wheel brake, and a third lever having arms at opposite sides of said shaft and pivotally connected to said rockable levers at different distances from the axes of said shafts.

10. A motor vehicle having front and rear wheel brakes and a torque tube, in combination with a support rigidly secured to said torque tube, a sleeve journaled in said support, a shaft journaled in said sleeve, a lever mounted upon said sleeve, a lever mounted upon said shaft, means for connecting said first mentioned lever to the front wheel brakes, means for connecting the second mentioned lever to the rear wheel brakes, and another lever pivotally connected to said levers.

11. A motor vehicle having front and rear wheel brakes, a chassis frame, and a torque tube, in combination with a support rigidly secured to said torque tube and having depending arms, a sleeve journaled in said arms, a shaft journaled in said sleeve, a pair of levers mounted upon said sleeve, a pair of levers mounted upon said shaft and extending in opposite directions from said first mentioned levers, means for connecting said first mentioned pair of levers to the front wheel brakes, means for connecting the second pair of levers to the rear wheel brakes, and another lever having arms on opposite sides of said sleeve and shaft and pivotally connected to the levers mounted on the adjacent ends of said sleeve and shaft.

12. A motor vehicle having front and rear wheel brakes, a chassis frame and a transmission mounted on said frame, in combination with a bracket secured to said transmission, a sleeve journaled in said bracket, a shaft journaled in said sleeve, rockable levers on said sleeve and shaft, and a third lever pivotally connected to said rockable levers.

13. A motor vehicle having front and rear wheel brakes, a chassis frame and a transmission mounted on said frame, in combination with a bracket secured to said transmission, a sleeve journaled in said bracket, a shaft journaled in said sleeve, rockable levers on said sleeve and shaft and extending in opposite directions therefrom, and a third lever having arms pivotally connected to said rockable levers at opposite sides of said shaft.

14. Brake mechanism, comprising a sleeve journaled at longitudinally spaced zones, a shaft journaled in said sleeve and extending therebeyond, an evener lever, a lever fixed to said sleeve between said zones and connected to said evener lever, levers fixed to said sleeve and shaft and extending in different directions, and a third lever pivotally connected to said last mentioned levers to actuate the same.

GEORGE JOSEPH THOMAS.